United States Patent
Kudo et al.

(10) Patent No.: US 9,160,600 B2
(45) Date of Patent: Oct. 13, 2015

(54) METHOD FOR RECEIVING FREQUENCY DOMAIN MULTIPLEXED SIGNAL AND DEVICE FOR RECEIVING FREQUENCY DOMAIN MULTIPLEXED SIGNAL

(75) Inventors: Riichi Kudo, Yokosuka (JP); Takayuki Kobayashi, Yokosuka (JP); Koichi Ishihara, Yokosuka (JP); Yasushi Takatori, Atsugi (JP); Hideyuki Nosaka, Atsugi (JP); Munehiro Matsui, Yokosuka (JP); Masato Mizoguchi, Yokosuka (JP); Tadao Nakagawa, Yokosuka (JP); Etsushi Yamazaki, Yokosuka (JP); Akihide Sano, Yokosuka (JP); Yutaka Miyamoto, Yokosuka (JP); Eiji Yoshida, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 205 days.

(21) Appl. No.: 13/381,114

(22) PCT Filed: Jul. 15, 2010

(86) PCT No.: PCT/JP2010/061972
§ 371 (c)(1),
(2), (4) Date: Dec. 28, 2011

(87) PCT Pub. No.: WO2011/007829
PCT Pub. Date: Jan. 20, 2011

(65) Prior Publication Data
US 2012/0106618 A1    May 3, 2012

(30) Foreign Application Priority Data
Jul. 17, 2009    (JP) .................. 2009-169455
Jul. 17, 2009    (JP) .................. 2009-169460

(51) Int. Cl.
H04B 1/10     (2006.01)
H04L 27/26    (2006.01)
H04L 25/03    (2006.01)

(52) U.S. Cl.
CPC ...... *H04L 27/2672* (2013.01); *H04L 25/03159* (2013.01); *H04L 27/265* (2013.01); *H04L 27/266* (2013.01); *H04L 27/2633* (2013.01); *H04L 2025/03414* (2013.01)

(58) Field of Classification Search
CPC ............ H04L 27/2672; H04L 27/266; H04L 25/03159; H04L 27/265; H04L 27/2633; H04L 2025/03414
USPC ........................................ 375/232, 340, 350
See application file for complete search history.

(56) References Cited

U.S. PATENT DOCUMENTS

| | | | |
|---|---|---|---|
| 4,300,229 A | 11/1981 | Hirosaki | |
| 5,390,185 A * | 2/1995 | Hooijmans et al. | 370/431 |
| 6,631,175 B2 | 10/2003 | Harikumar et al. | |
| 7,714,937 B2 * | 5/2010 | Kim et al. | 348/607 |
| 8,116,367 B2 * | 2/2012 | Carrer et al. | 375/233 |
| 8,125,885 B2 * | 2/2012 | Bertrand et al. | 370/203 |
| 8,315,299 B2 * | 11/2012 | Harikumar et al. | 375/232 |
| 8,665,799 B2 * | 3/2014 | Malladi et al. | 370/329 |
| 2004/0086027 A1 | 5/2004 | Shattil | |
| 2005/0157782 A1 | 7/2005 | Lakkis | |
| 2008/0273481 A1 * | 11/2008 | Chang | 370/311 |

FOREIGN PATENT DOCUMENTS

| | | |
|---|---|---|
| CN | 1278127 A | 12/2000 |
| JP | 2002-101069 A | 4/2002 |
| JP | 2003-032222 A | 1/2003 |
| JP | 2009-141514 A | 6/2009 |

OTHER PUBLICATIONS soo-Chang Pei, "Generalized eigenvectors and fractionalization of offset DFTs and DCTs" IEEE Transcation on Signal Processing, vol. 52, No. 7, Jul. 2004.*

Shieh, W., et al., "Coherent optical orthogonal frequency division multiplexing," Electronics Letters, vol. 42, No. 10, May 11, 2006, pp. 587-589.

Notice of Reasons for Rejection, Japanese Patent Application No. 2011-522847, Apr. 16, 2013.

Hattori, Takeshi, "OFDM/OFDMA Textbook," Impress R&D, Sep. 11, 2008, Ch. 11.
Morikura, Masahiro, et al., "802.11 High-Speed Wireless LAN Textbook," Revised Version, Impress R&D, Mar. 27, 2008, pp. 246-249.
Morikura, Masahiro, et al., "802.11 High-Speed Wireless LAN Textbook," Revised Third Version, Impress R&D, Mar. 27, 2008, pp. 156-157.
Kikuma, Nobuyoshi, "Adaptive Signal Processing with Array Antenna," Kagaku Gijutsu Shuppan, 1998, pp. 17-21.
Sano, Akihide, et al., "13.4 Tb/s (134×111 Gb/s/ch) no-guard-interval PDM CO-OFDM transmission over 3,600 km of SMF," Proceedings of the 2009 IEICE General Conference, Tsushin 2, Mar. 4, 2009, B-10-46, p. 365.
Search Report, European Patent Application No. 10799887.4, Jan. 17, 2013.
Fettweis, Gerhard, et al., "GFDM—Generalized Frequency Division Multiplexing," 2009 IEEE 69th Vehicular Technology Conference, Apr. 26-29, 2009, Barcelona, Spain, pp. 1-4.
Search Report, European Patent Application No. 13177394.7, Sep. 12, 2013.
Office Action, Chinese Patent Application No. 201080028997.1, Feb. 8, 2014.

\* cited by examiner

*Primary Examiner* — Dhaval Patel
(74) *Attorney, Agent, or Firm* — Harness, Dickey & Pierce, P.L.C.

(57) ABSTRACT

A frequency domain multiplexed signal receiving method which decodes received signals that are multiplexed in a frequency domain, includes: a digital signal acquisition step of acquiring digital signals from the received signals that are multiplexed in the frequency domain; an offset discrete Fourier transform step of applying an offset discrete Fourier transform to odd discrete point numbers based on the acquired digital signals; and a decode step of decoding frequency domain digital signals in the frequency domain obtained by the offset discrete Fourier transform, and that are the frequency domain digital signals of one or more frequency channels.

16 Claims, 9 Drawing Sheets

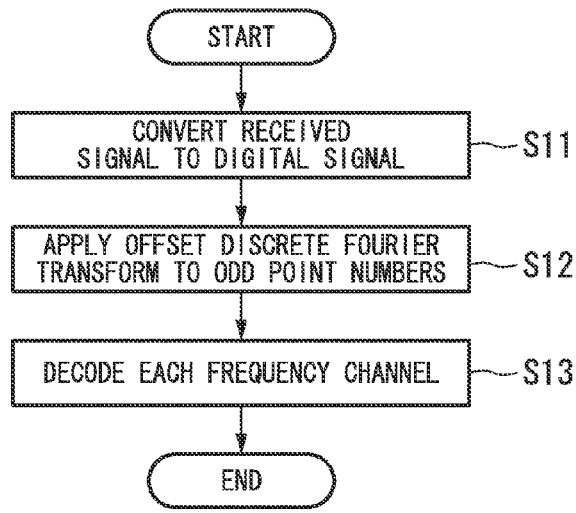
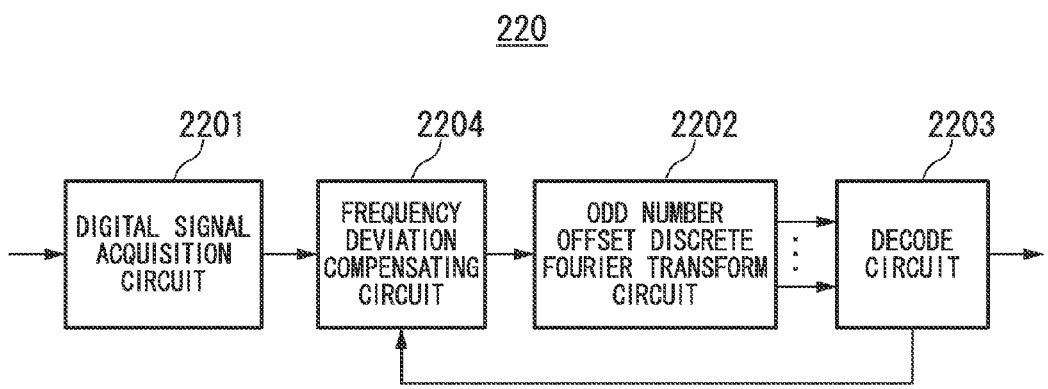

METHOD FOR RECEIVING FREQUENCY DOMAIN MULTIPLEXED SIGNAL AND DEVICE FOR RECEIVING FREQUENCY DOMAIN MULTIPLEXED SIGNAL

CROSS-REFERENCE TO RELATED APPLICATIONS

This application is a 371 U.S. National Stage of International Application No. PCT/JP2010/061972, filed on Jul. 15, 2010, which claims priority to Japanese Patent Applications Nos. JP 2009-169455 and JP 2009-169460, both filed Jul. 17, 2009. The disclosures of the above applications are incorporated herein by reference.

TECHNICAL FIELD

The present invention relates to a method for receiving frequency domain multiplexed signals and a device for receiving frequency domain multiplexed signals in a communication system in which signals are multiplexed in the frequency domain.

Furthermore, the present invention relates to a method for receiving frequency domain multiplexed signals and a device for receiving frequency domain multiplexed signals in which received signals that have been multiplexed in the frequency domain are equalized without applying a discrete Fourier transform.

Priority is claimed on Japanese Patent Application No. 2009-169460, filed Jul. 17, 2009, and Japanese Patent Application No. 2009-169455, filed Jul. 17, 2009, the contents of which are incorporated herein by reference.

BACKGROUND ART

In the field of wireless and optical communication, an orthogonal frequency division multiplexing system (OFDM: Orthogonal Frequency Division Multiplexing) is proposed for multiplexing transmitted signals in the frequency domain (for example, refer to Non-Patent Document 1).

In OFDM, there is an advantage in that the sampling frequency of an analog to digital converter (ADC: Analog Digital Converter) for discretizing received signals can be set to a frequency lower than a frequency of twice the baud rate of the received signals. Therefore, for example in a wireless LAN (Local Area Network) applied to IEEE802.11a, it is known that a band of approximately 16.6 MHz in a signal band of 20 MHz (megahertz) is used for data signals.

On the other hand, in single carrier transmission, an ADC is required that can be adapted to a sampling frequency of approximately twice the frequency band of a signal. Therefore the advantage of being able to set a frequency lower than the frequency of twice the baud rate in OFDM is that signals can be transmitted efficiently by an ADC with a low sampling frequency, especially in optical communication in which the application is limited by the sampling frequency of the ADC and high frequency wireless communication.

Moreover, in OFDM, the higher the number of frequency channels is increased, the easier the setting of the guard interval becomes, so that it can be assumed that flat fading will occur in each of the frequency channels. As a result, in a practical wireless system, a frequency channel number of approximately 64 to 1024 is selected. Furthermore, in general, in an OFDM system, the frequency at a receiving device is "0", that is, it has a frequency channel corresponding to a DC component. In a frequency channel corresponding to a DC component, the characteristics deteriorate due to the influence of interference between signals and noise. Therefore, frequency channels corresponding to these are not generally used.

In the fields of wireless communication and optical communication, a frequency division multiplexing system (FDM: Frequency Division Multiplexing) and an orthogonal frequency division multiplexing system (OFDM: Orthogonal Frequency Division Multiplexing) for multiplexing transmitted signals in the frequency domain are proposed. In communication systems in which signals are multiplexed in the frequency domain, on the receiving side, it is possible to extract and decode corresponding frequency domains using analog filters and Fourier transforms (for example, refer to Non-Patent Document 3).

PRIOR ART DOCUMENTS

Non-Patent Documents

[Non-Patent Document 1] Takeshi Hattori, "OFDM/OFDMA Textbook" Impress R&D, Sep. 11, 2008
[Non-Patent Document 2] Masahiro Morikura, Shuji Kubota, "Revised Version 802.11 High Speed Wireless LAN Textbook" Impress R&D, Mar. 27, 2008
[Non-Patent Document 3] Masahiro Morikura, Shuji Kubota, "Revised Third Version 802.11 High Speed Wireless LAN Textbook" Impress R&D, Mar. 27, 2008, pp. 156-157
[Non-Patent Document 4] Nobuyoshi Kikuma, "Adaptive Signal Processing with Array Antenna", Kagaku Gijutsu Shuppan, 1998, pp. 17-21

DISCLOSURE OF INVENTION

Problem to be Solved by the Invention

A first problem will be described.

In a receiving device, in the case where the peak to average power ratio (PAPR) of a transmitted signal has a great influence on the communication quality, a large number of frequency channel numbers cannot be set. Moreover, also in the case where part of an OFDM is separated using a filter, the number of frequency channels in the OFDM contained in the frequency band of the received signal becomes lower due to the influence of the filter.

In such cases, by performing equalization processing, decoding is also possible for each of the frequency channels on the receiving side, without using guard intervals. However, since the number of sub carriers is reduced, having the frequency channel centered on the DC component, as in IEEE802.11a, and because this frequency channel is influenced by noise and interference between signals, it is not used for data signal transmission, and the loss in transmission rate becomes greater.

For example, as shown in FIG. 2, a case is assumed where a two carrier OFDM signal is received in which a signal with a transmission symbol rate of 5 Gbaud (gigabaud) is multiplexed into two frequency bands. The gap I between adjacent frequency channels is 5 GHz (gigahertz). The application of a discrete Fourier transform to the received signal will be considered. A discrete Fourier transform is a transform whereby a signal in the time domain is converted into a signal in the frequency domain. If a discrete Fourier transform of four points (central frequencies: ±2.5 GHz, ±5 GHz) is applied, signal domains corresponding to two frequency channels can be obtained. However, in this case, an ADC is required that operates at 20 GHz, which is a major limiting factor on the transmission rate, and also increases the cost of the receiving device. In FIG. 2, reference symbol C1 indicates the central frequency of signal channel 1, and reference symbol C2 indicates the central frequency of signal channel 2. Reference symbol P indicates the frequency band to which four frequency channels of a conventional Fourier transform correspond.

As described above, in the case where a few frequency channels are received, when the received signal is converted into a signal in the frequency domain using a base 2 Fourier transform, which is a high speed Fourier transform condition, it is not possible to make good use of the advantage of the OFDM system, which originally can be operated at twice or less oversampling. Therefore, a problem occurs in that an ADC is required that has a fast operating clock.

A second problem will be described.

A transmitting device that generates a transmitted signal and a receiving device that receives the signal transmitted as a received signal are connected to different reference signal generators. There is normally a frequency deviation between the frequencies of the reference signal generators. Therefore, in the case where the receiving device uses a filter to extract a specific frequency domain from the received signal transmitted in synchronization with the frequency of the transmitting device, or in the case of applying a Fourier transform, it is necessary to compensate for the frequency deviation from the received signal accurately. In the receiving device, if the frequency deviates, the signal quality deteriorates due to signals leaking in from adjacent frequency channels. In particular, in optical communication in which synchronous detection is performed, the frequency deviation generated between a laser light used for transmission and a laser light used for reception is great, so that such a problem is likely to occur.

A conventional receiving device 190 is shown in FIG. 13 with an orthogonal frequency division multiplexing system as an example (for example, refer to Non-Patent Document 3). This receiving device 190 has a digital signal acquisition circuit 1901, a Fourier transform circuit 1902, and a decode circuit 1903. The received signal is converted into a digital signal in the digital signal acquisition circuit 1901, Fourier transformed in the Fourier transform circuit 1902, and decoded in the decode circuit 1903. However, if the frequency deviation is not fully compensated in the Fourier transform circuit 1902, interference power remains, which causes the signal to deteriorate. The influence from this frequency deviation will be described with reference to FIG. 14A and FIG. 14B. FIG. 14A and FIG. 14B show examples of acquiring two signal channels, frequency channels A and B. The central frequencies of the frequency channels A and B are designated fa and fb respectively. FIG. 14A is a case in which no frequency deviation remains. In this case, if a Fourier transform is applied, it is possible to acquire electric power from the central part of each of the signals. At this time, since the signal of the next frequency channel is centered on a signal with a different frequency channel, being 0, no interference occurs between the signals. However, in a state as in FIG. 14B in which the frequencies of the frequency channels A' and B' of the received signals are shifted to fa' and fb', with respect to the central frequencies fa and fb, in the Fourier transform circuit 1902, a frequency deviation Δf remains. Due to this interference between signals there is a problem in that the communication quality deteriorates.

As above, in a receiving device that receives signals multiplexed in the frequency domain, it is necessary to perform highly accurate frequency deviation compensation in order to apply a discrete Fourier transform. However, in order to perform such frequency deviation compensation before an inverse Fourier transform is applied on the transmitting device side, there is a problem in that the load on the communication system, such as the insertion of known signals and the introduction of a complicated frequency estimation algorithm, becomes great.

The present invention has been made in view of the above circumstances.

A first object of embodiments of the present invention is to provide a method for receiving frequency domain multiplexed signals and a device for receiving frequency domain multiplexed signals whereby sampling is possible at a frequency lower than twice the frequency of the frequency band of the received signals.

A second object of the embodiments of the present invention is to provide a method for receiving frequency domain multiplexed signals and a device for receiving frequency domain multiplexed signals that decode without applying a Fourier transform independently.

Means for Solving the Problem

In order to solve the problems, a frequency domain multiplexed signal receiving method according to an aspect B1, which decodes received signals that are multiplexed in a frequency domain, includes: a digital signal acquisition step of acquiring digital signals from the received signals that are multiplexed in the frequency domain; an offset discrete Fourier transform step of applying an offset discrete Fourier transform to odd discrete point numbers based on the acquired digital signals; and a decode step of decoding frequency domain digital signals in the frequency domain obtained by the offset discrete Fourier transform, and that are the frequency domain digital signals of one or more frequency channels.

In the above aspect, there may be further provided a frequency deviation compensation step of compensating for frequency deviation with respect to frequencies of the obtained digital signals, and the offset discrete Fourier transform step may apply an offset discrete Fourier transform to odd discrete point numbers with respect to the digital signals that are frequency transformed into the frequencies in which the frequency deviation is compensated.

The frequency domain multiplexed signal receiving method according to the above aspect may further include a frequency deviation estimation step of estimating a residual frequency deviation of each of the frequency channels, or a frequency deviation common to all of the frequency channels, from the digital signals transformed into the frequency domain by the offset discrete Fourier transform step, and updating frequency deviation information indicating the frequency deviation, and the frequency deviation compensation step may compensate for the frequency deviation with respect to the frequencies of the obtained digital signals based on the frequency deviation information.

In the above aspect, the offset discrete Fourier transform step may apply an offset discrete Fourier transform to odd discrete point numbers with respect to the digital signals using a convolution calculation, and calculates and outputs only frequency channels corresponding to the digital signals.

In the above aspect, the offset discrete Fourier transform step may acquire, with the discrete point number of the offset discrete Fourier transform being three, two frequency channels out of them.

In the above aspect, the offset discrete Fourier transform step may compensate for an individual frequency deviation in each of the frequency channels.

A frequency domain multiplexed signal receiving device according to an aspect B2 of the present invention, which decodes received signals that are multiplexed in a frequency domain, includes: a digital signal acquisition section which acquires digital signals from the received signals that are multiplexed in the frequency domain; an offset discrete Fourier transform section which applies an offset discrete Fourier transform to odd discrete point numbers based on the acquired digital signals; and a decode section which decodes frequency domain digital signals in the frequency domain obtained by the offset discrete Fourier transform, and that are the frequency domain digital signals of one or more frequency channels.

The frequency domain multiplexed signal receiving device according to the above aspect, may further include a frequency deviation compensation section which compensates for frequency deviation with respect to frequencies of the obtained digital signals, and the offset discrete Fourier transform section may apply an offset discrete Fourier transform to odd discrete point numbers with respect to the digital signals that are frequency transformed into the frequencies in which the frequency deviation is compensated.

In the above aspect, there may be further provided a frequency deviation estimation section which estimates a residual frequency deviation in the offset discrete Fourier transform section from the obtained digital signals, and updates frequency deviation information indicating the frequency deviation, and the frequency deviation compensation section may compensate for the frequency deviation with respect to the frequencies of the obtained digital signals based on the frequency deviation information.

A method for receiving frequency domain multiplexed signals according to an aspect A1 of the present invention, which decodes received signals that have been multiplexed in the frequency domain, has: a digital signal acquisition step for acquiring digital signals from received signals that have been multiplexed in the frequency domain; a branching step, which branches the obtained digital signals into frequency channels for decoding; an initial coefficient storage step, which stores different coefficients with low correlation as initial weights with respect to each of the branched signal series; an equalization step, which equalizes each of the branched signal series using different coefficients, and a decode step for decoding each of the equalized signal series.

A frequency domain multiplexed signal receiving method according to an aspect A2 of the present invention, which decodes received signals that are multiplexed in a frequency domain, includes: a digital signal acquisition step of acquiring digital signals from the received signals that are multiplexed in the frequency domain; a branching step of branching the obtained digital signals to frequency channel numbers for decoding; an initial coefficient storage step of storing coefficients having high correlation with coefficients of a discrete Fourier transform corresponding to each of the frequency channels, or coefficients including at least part of them, with respect to each of the branched signal sequences as initial weights; an equalization step of equalizing the coefficients stored in the initial coefficient storage step as the initial weights; and a decode step of decoding each of the equalized signal sequences.

In the above aspect, the branch step may branch, when branching the digital signals, after applying a frequency transform such that a central frequency of each of the frequency channels approaches the vicinity of a specific frequency component, and the initial coefficient storage step may store coefficients having high correlation with coefficients of the discrete Fourier transform corresponding to a specific frequency component in discrete Fourier transform, or coefficients including at least part of them, as initial weights, in the discrete Fourier transform.

In the above aspect, equalization coefficients may be adjusted such that each of the equalized signal sequences equalized in the equalization step does not converge to a signal sequences indicating the same signal.

A frequency domain multiplexed signal receiving method according to an aspect A3, which decodes received signals that are multiplexed in a frequency domain, includes: a digital signal acquisition step of acquiring two received signals that are multiplexed in the frequency domain with respect to different polarization components, and acquiring digital signals from each of them; a branching step of branching the two acquired digital signals to frequency channel numbers for decoding; an initial coefficient storage step of storing, with respect to two signal sequences corresponding to a $k^{th}$ frequency channel among the branched signal sequences, $[0, \ldots, 0, b_{xx}a_{k,0}, b_{xx}a_{k,1}, \ldots, b_{xx}a_{k,n-1}, 0, \ldots 0]$ and $[0, \ldots, 0, b_{yx}a_{k,0}, b_{yx}a_{k,1}, \ldots, b_{yx}a_{k,n-1}, 0, \ldots 0]$ in order to decode a signal corresponding to one polarization, and $[0, \ldots, 0, b_{xy}a_{k,0}, b_{xy}a_{k,1}, \ldots, b_{xy}a_{k,n-1}, 0, \ldots 0]$ and $[0, \ldots, 0, b_{yy}a_{k,0}, b_{yy}a_{k,1}, \ldots, b_{yy}a_{k,n-1}, 0, \ldots 0]$ in order to decode a signal corresponding to a different polarization, as initial weights of signal sequences of the two polarization components, using coefficients $a_{k,0}, a_{k,1}, \ldots, a_{k,n-1}$ of an n point discrete Fourier transform, such that each satisfies $b_{xx}b_{xy}+b_{yx}b_{yy}=0$; an equalization step of equalizing the received signals with respect to the two polarization components using the coefficients stored in the initial coefficient storage step as the initial weights; and a decode step of decoding each of the equalized signal sequences.

A frequency domain signal receiving method according to an aspect A4 of the present invention, which decodes received signals that are multiplexed in a frequency domain, includes: a digital signal acquisition section which acquires digital signals from received signals that are multiplexed in the frequency domain; a branching section which branches the obtained digital signals to the frequency channel numbers for the decoding; an initial coefficient storage section which stores initial weights used to equalize signals of each of the frequency channels; an equalization section which equalizes the branched signal sequences using coefficients input from the initial coefficient storage section; and a decode section which decodes each of the equalized signal sequences.

A frequency domain signal receiving device according to an aspect A5 of the present invention, which decodes optical signals that are multiplexed in a frequency domain, includes: a photoelectric converter section which converts the optical signals into electrical signals; a digital signal acquisition section which acquires digital signals from the electrical signals; a branching section which branches the obtained digital signals to frequency channel numbers for decoding; an initial coefficient storage section which stores initial weights used to equalize signals of each of the frequency channels; an equalization section which equalizes the branched signal sequences using coefficients input from the initial coefficient storage section; and a decode section which decodes each of the equalized signal sequences.

Effect of the Invention

According to an embodiment of the present invention, a digital signal acquisition step acquires digital signals from received signals that are multiplexed in the frequency domain. An offset discrete Fourier transform step applies an offset discrete Fourier transform to odd discrete point numbers based on the obtained digital signals. A decode step decodes frequency domain digital signals in the frequency domains obtained by the offset discrete Fourier transform, which are the frequency domain digital signals of one or more frequency channels.

As a result, in the case where a few frequency channels are received, even if the received signals are transformed into signals in the frequency domain using a Fourier transform, it is possible to select frequency channels corresponding to the transmitted signals appropriately. Furthermore, it is possible to reduce the sampling frequency of an ADC that acquires the signal position using a Fourier transform.

According to another embodiment of the present invention, a digital signal acquisition step acquires digital signals from the received signals that are multiplexed in a frequency domain. A branching step branches the obtained digital signals to frequency channel numbers for decoding. An initial coefficient storage step stores different coefficients with low correlation as initial weights with respect to each of the branched signal sequences. An equalization step equalizes each of the branched signal sequences using the different coefficients. A decode step decodes each of the equalized signal series.

As a result, it is possible to decode signals transmitted by an orthogonal frequency division multiplexing system without applying a discrete Fourier transform.

According to yet another embodiment of the present invention, a digital signal acquisition step acquires digital signals from received signals that are multiplexed in the frequency domain. A branching step branches the obtained digital signals to frequency channels for decoding. An initial coefficient storage step stores coefficients having high correlation with the coefficients of a discrete Fourier transform corresponding to each of the frequency channels, or coefficients including at least part of them, as initial weights with respect to each of the branched signal series. An equalization step equalizes the coefficients stored in the initial coefficient storage step as initial weights. A decode step decodes each of the equalized signal sequences.

As a result, since the received signals that are multiplexed in the frequency domain are equalized without a discrete Fourier transform, an individual discrete Fourier transform section for decoding the frequency channels can be omitted, so that it is possible to simplify the structure of the receiving device.

BRIEF DESCRIPTION OF THE DRAWINGS

FIG. 3 is a flow chart showing a processing procedure according to the embodiment B1.

FIG. 4 is a block diagram showing the structure of a receiving device according to an embodiment B2.

EMBODIMENTS FOR CARRYING OUT THE INVENTION

Hereunder is a description of embodiments of the present invention with reference to the figures.

Embodiment B1

Figure 1:
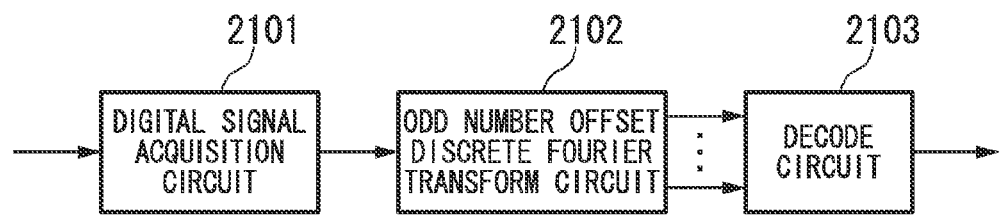
FIG. 1 is a block diagram showing the structure of a receiving device according to an embodiment B1 of the present invention.

FIG. 1 is a block diagram showing the structure of a receiving device according to an embodiment B1 of the present invention.

A receiving device 210 shown in this figure includes a digital signal acquisition circuit 2101, an odd number offset discrete Fourier transform circuit 2102, and a decode circuit 2103.

The digital signal acquisition circuit 2101 converts received signals (analog signals) into digital signals.

The odd number offset discrete Fourier transform circuit 2102 applies an offset discrete Fourier transform, which is described later, to digital signals converted according to the received analog signals, and outputs frequency channels corresponding to the received signals. The decode circuit 2103 decodes the transmitted signals from the received signals of each of the frequency channels transformed by the odd number offset discrete Fourier transform circuit 2102.

Hereunder the specific operation of an offset discrete Fourier transform is described.

When a discrete Fourier transform is applied to n complex number sequences $X_0, \ldots, X_{n-1}$, n complex number sequences $Y_0, \ldots, Y_{n-1}$ are acquired. A signal $Y_k$ of the $k^{th}$ frequency channel is shown in formula (B1).

Formula (B1)

$$Y_k = \sum_{i=0}^{n-1} X_i \exp\left(-\frac{2\pi ki}{n} j\right) \quad (B1)$$

In formula (B1), 'j' represents the imaginary unit. If transformed as in this formula (B1), a received signal can be transformed into a signal in the frequency domain with no discrepancy. However, in the case of transforming into a few frequency channels, since one of the frequency channels corresponds to a DC component, one of the frequency channels cannot be used due to interference power, so that there is a problem in that the throughput drops.

An example of an arrangement of the frequencies of a few frequency channels is shown with reference to the figures.

Figure 2:
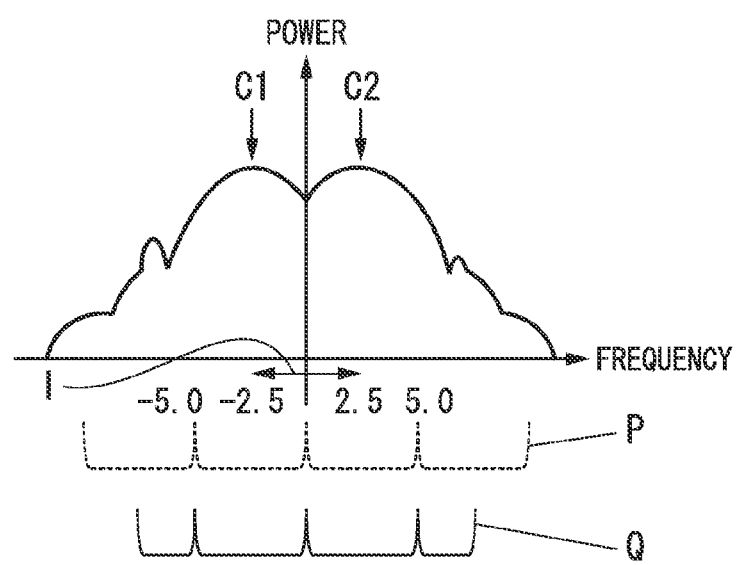
FIG. 2 is a schematic diagram showing the amplitude distribution of a signal at the time of synchronous detection using a reference signal of the central frequency number of a signal, according to the embodiment B1.

FIG. 2 is a schematic diagram showing the intensity distribution of a signal at the time of synchronous detection using a reference signal of the central frequency number of a signal. In FIG. 2, reference symbol Q indicates the frequency bands to which three frequency channels of the present embodiment correspond.

For example, assume a case of receiving a two carrier OFDM signal corresponding to two frequency bands, which includes a 5 Gbaud (gigabaud) signal. The distance I between adjacent frequency channels is 5 GHz (gigahertz).

According to the present embodiment, it can be transformed by the digital signal acquisition circuit 2101 (FIG. 1) using an analog to digital converter (ADC) with a sampling frequency of 15 GS/s (giga samples/second), and decoded by the odd number offset discrete Fourier transform circuit 2102 and the decode circuit 2103.

Since FIG. 2 shows the spectrum of a signal in a base band, a negative frequency less than or equal to the DC component (frequency 0) is defined. In the case where the ADC operates at 15 GHz, −7.5 GHz to 0 GHz is equivalent to 7.5 GHz to 15 GHz.

In the present embodiment, an offset discrete Fourier transform is applied. When the offset discrete Fourier transform is applied, n complex number sequences $Z_0, \ldots, Z_{n-1}$ can be obtained by the arithmetic expression shown in formula (B2).

Formula (B2)

$$Z_k = \sum_{i=0}^{n-1} X_i \exp\left(-\frac{\pi i(2k+1)}{n}j\right) \quad (B2)$$

In formula (B2), 'j' represents the imaginary unit, and 'n' represents an odd number. By transforming using the arithmetic expression shown in formula (B2), it is possible to lower the frequency of the sampling clock of the ADC. In the case of n=3, as shown in FIG. 2, one of three frequency channels corresponds to the two frequency bands of a high frequency and a low frequency, so the signals are mixed. However, it is possible to obtain the information of the frequency domains with respect to two frequency channels without using this frequency channel information, or without performing a calculation.

Hereunder, the number (n) of whole frequency channels acquired by a discrete Fourier transform denotes the "point number" of a discrete Fourier transform.

In general, the number of frequency channels multiplexed in the frequency domain in the OFDM is an even number (refer to Non-Patent Document 2). It is easier to perform signal processing of data by dealing with every one or an even number of frequency channels. Therefore, in order to acquire signals of an even number of frequency channels using an ADC with a low sampling rate, it is effective to make the point number of the discrete Fourier transform an odd number. In this case, the odd number offset discrete Fourier transform circuit 2102 outputs the results of even numbers of frequency channels at the center, to the decode circuit 2103.

The phenomenon shown in FIG. 2 in which one of three frequencies extends to a plurality of frequencies also occurs in the case where the point number of the discrete Fourier transform is greater than 3. That is, since the frequency domain signal $Z_{(n-1)/2}$ corresponding to this frequency band in formula (B2) cannot express a specific frequency, it is incomplete as a transform to the original frequency domain. However, by breaking up such incomplete frequency channel information, the odd number offset discrete Fourier transform circuit 2102 can acquire signals existing in a specific frequency domain.

The offset discrete Fourier transform in the odd number offset discrete Fourier transform circuit 2102 may be applied to every block, or may be applied as a convolution calculation.

In the case of applying to every block, in the received sequence $X_k$, an offset discrete Fourier transform is applied to every $(X_d, \ldots, X_{d+(n-1)})$, $(X_{d+G}, \ldots, X_{d+(G+n-1)})$, $(X_{d+2G}, \ldots, X_{d+(2G+n-1)}) \ldots$ and G symbol. Here, 'd' denotes the first position of a signal. In the case of performing a convolution calculation, it is possible to convolve the received signals with the coefficient which is multiplied to Xi in formula (B2). Furthermore, this also applies to the block calculation with G=1.

A processing procedure of the present embodiment will be described using the figures.

FIG. 3 is a flow chart showing the processing procedure according to the present embodiment.

When the receiving device 210 receives received signals, the digital signal acquisition circuit 2101 converts them to digital signals according to the signals received (step S11). The odd number offset discrete Fourier transform circuit 2102 applies an offset discrete Fourier transform to the odd point numbers (step S12).

The decode circuit 2103 decodes the signals of each of the frequency channels corresponding to the acquired signals (step S13).

In the receiving method according to the above processing procedure, even in the case where an ADC is used in which the sampling clock frequency is lower than a frequency of twice the frequency band, it is possible to decode the desired received signals. In the above steps, the odd number offset discrete Fourier transform circuit 2102 can also compensate for frequency deviation according to the frequency deviation information indicating the frequency deviation of the converted digital signals. Furthermore, the decode circuit 2103 can also feed the estimated frequency deviation signals back to the frequency deviation compensating circuit 2102.

Embodiment B2

FIG. 4 is a block diagram showing the structure of a receiving device according to an embodiment B2 of the present invention.

A receiving device 220 shown in this figure includes a digital signal acquisition circuit 2201, an odd number offset discrete Fourier transform circuit 2202, a decode circuit 2203, and a frequency deviation compensating circuit 2204.

The digital signal acquisition circuit 2201 converts received signals (analog signals) into digital signals.

The frequency deviation compensating circuit 2204 compensates for frequency deviation occurring in the received signals using any of the received signals corresponding to the check signals inserted in the transmitted signals, the characteristics of the modulation system of the signals transmitted, and frequency deviation information input from other receiving circuit blocks. The frequency deviation occurring in the received signals denotes the frequency deviation between the frequency that generated the transmitted signals and the frequency that the receiving device 220 uses as a reference.

The odd number offset discrete Fourier transform circuit 2202 applies an offset discrete Fourier transform, which is described later, to digital signals that have been converted according to the received analog signals, and for which the frequency deviation compensating circuit 2204 has compensated for the frequency deviation, and outputs frequency channels corresponding to the received signals.

The decode circuit 2203 decodes the transmitted signals from the received signals of each of the frequency channels transformed by the odd number offset discrete Fourier transform circuit 2102.

For a method of estimating the frequency deviation used by the decode circuit 2203, for example a blind algorithm, a known signal proposed in wireless communication, or a decoded signal can be used (for example, refer to Non-Patent Document 4). In the case where a frequency deviation $\Delta f$ exists, the frequency deviation compensating circuit 2204 calculates frequency deviation compensated received signals $X'_k$ in which the frequency deviation is compensated with respect to the received signals in which frequency deviation occurred using formula (B3).

Formula (B3)

$$X'_k = X_k \exp\left(\frac{-2\pi k \Delta f}{F_s} j\right) \quad (B3)$$

Hereunder, it is possible to separate transmitted signals in appropriate frequency locations after compensating for the orthogonal degradation due to frequency deviation, by applying an offset discrete Fourier transform to the frequency deviation compensation received signals $X'_k$ using the odd number offset discrete Fourier transform circuit 2202.

It is also possible to apply a frequency transform shown in formula (B4) in the frequency deviation compensating circuit 2204 in advance.

Formula (B4)

$$X'_k = X_k \exp\left(-\frac{2\pi k\left(\frac{F_s}{2n} + \Delta f\right)}{F_s} j\right) \quad (B4)$$

The frequency transform shown in formula (B4) transforms to frequencies which is shifted by half the frequency channel occupying frequency band width. The frequency deviation compensating circuit 2204 can also apply a Fourier transform in the odd number offset discrete Fourier transform circuit 2202 after applying the frequency transform shown in formula (B4). In this manner, an offset discrete Fourier transform can also be realized by the frequency deviation compensating circuit 2204 and the odd discrete Fourier transform circuit 2202.

The frequency deviation signal estimated in the decode circuit 2203 may be fed back as $\Delta f$.

A processing procedure of the present embodiment will be described using the figures.

Figure 5:
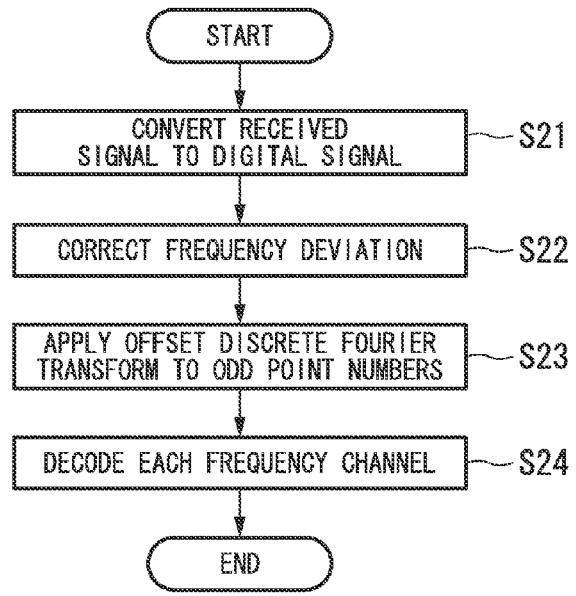
FIG. 5 is a flow chart showing a processing procedure according to the embodiment B2.

FIG. 5 is a flow chart showing the processing procedure according to the present embodiment.

When the receiving device 220 receives received signals, the digital signal acquisition circuit 2201 converts them to digital signals according to the signals received (step S21). The frequency deviation compensating circuit 2204 compensates for frequency deviation according to frequency deviation information that indicates the frequency deviation of the converted digital signals (step S22). The odd number offset discrete Fourier transform circuit 2202 applies an offset discrete Fourier transform to the odd point numbers (step S23).

The decode circuit 2203 decodes the signals of each of the frequency channels corresponding to the acquired signals (step S24). Furthermore, the decode circuit 2203 feeds the estimated frequency deviation signals back to the frequency deviation compensating circuit 2204 (step S24).

The frequency deviation information stored in step S24 is derived by calculation processing performed repeatedly, and used as reference information in the frequency deviation compensating circuit 2204.

In the receiving method according to the above processing procedure, even in the case where an ADC is used in which the sampling clock frequency is lower than a frequency of twice the frequency band, it is possible to decode the desired received signals.

Embodiment B3

Figure 6:
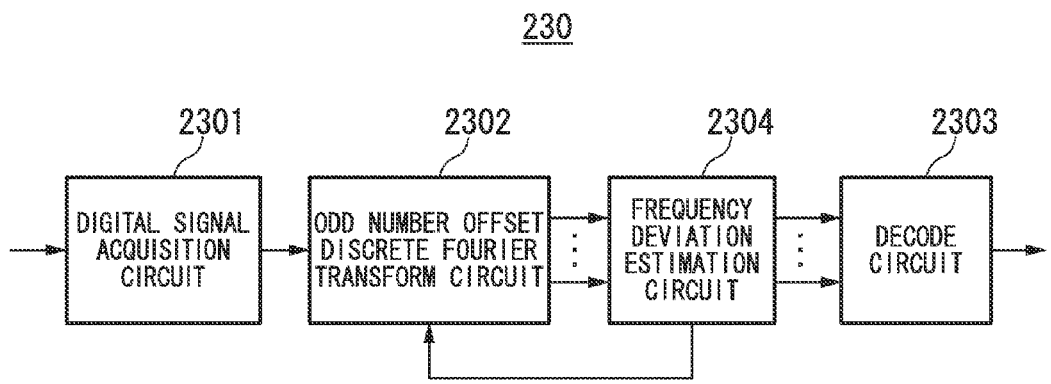
FIG. 6 is a block diagram showing the structure of a receiving device according to an embodiment B3.

FIG. 6 is a block diagram showing the structure of a receiving device according to an embodiment B3 of the present invention.

A receiving device 230 shown in this figure includes a digital signal acquisition circuit 2301, an odd number offset discrete Fourier transform circuit 2302, a decode circuit 2303, and a frequency deviation estimation circuit 2304.

The digital signal acquisition circuit 2301 converts received signals (analog signals) into digital signals. The frequency deviation estimation circuit 2304 compensates for frequency deviation occurring in the received signals using any of the received signals corresponding to the check signals inserted in the transmitted signals, the characteristics of the modulation system of the transmitted signals, and frequency deviation information input from other receiving circuit blocks. The frequency deviation occurring in the received signals denotes the frequency deviation between the frequency that generated the transmitted signals and the frequency that the receiving device 230 uses as a reference.

The odd number offset discrete Fourier transform circuit 2302 outputs frequency channels corresponding to the received signals, which have been converted according to the received analog signals, and to which an odd number offset discrete Fourier transform is applied in which frequency deviation is considered.

The frequency deviation estimation circuit 2304 estimates the residual frequency deviation information using digital signals of the frequency channels output from the odd number offset discrete Fourier transform circuit 2302, and outputs them to the odd number offset Fourier transform circuit 2302. Moreover, the frequency deviation estimation circuit 2304 outputs the digital signals to the decode circuit 2303.

The decode circuit 2303 decodes the transmitted signals from the received signals of each of the frequency channels, which are digital signals output by the frequency deviation estimation circuit 2304, and that are transformed by the odd number offset discrete Fourier transform circuit 2302.

The calculation process in the odd number offset discrete Fourier transform in which frequency deviation is considered is shown in formula (B5).

Formula (B5)

$$Z_k = \sum_{i=0}^{n-1} X_i \exp\left(\pi i\left(\frac{(2k+1)}{n} - \frac{2\Delta f}{F_s}\right)j\right) \quad (B5)$$

The signal of the $k^{th}$ frequency channel output is input to the frequency deviation estimation circuit 2304, and the frequency deviation is estimated. For a method of compensating for frequency deviation, estimation is possible using for example a frequency deviation compensation method in which a blind algorithm or a known signal proposed for wireless communication is used (for example, refer to Non-Patent Document 4). Since the frequency deviation $\Delta f_0$ estimated here is the residual frequency deviation in the offset discrete Fourier transform circuit 2302, the frequency deviation information is updated as $(\Delta f + \Delta f_0)$ in the offset discrete Fourier transform circuit 2302, and thereby it is possible to prevent the interference power due to the frequency deviation from increasing.

Alternatively, by the odd number offset discrete Fourier transform circuit having a function of compensating for frequency deviation in this manner, it is possible to compensate for the residual frequency deviation in each of the frequency channels individually. Accordingly, the frequency deviation estimation circuit 2304 can also estimate the frequency deviation with respect to each of the frequency channels, output frequency deviation information to the odd number offset discrete Fourier transform circuit 2302, and compensate for the frequency deviation in each of the frequency channels. Furthermore, the decode circuit 2303 can also estimate the frequency deviation in each of the frequency channels, and output it to the odd number offset discrete Fourier transform circuit 2302. In this case, $\Delta f$ in formula (B5) is different for each of the frequency channels, and $\Delta f_k$ can be used as the frequency deviation of the $k^{th}$ frequency channel.

A processing procedure of the present embodiment will be described using the figures.

Figure 7:
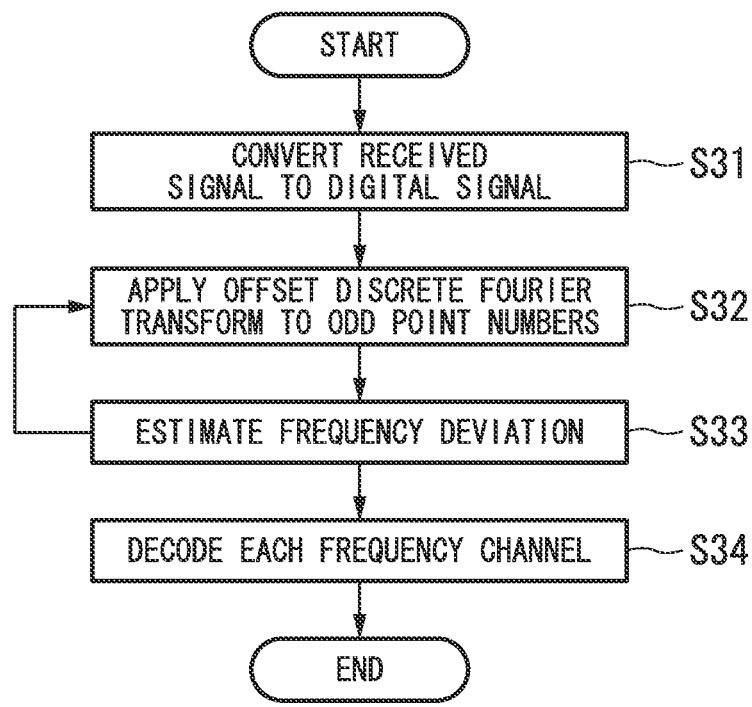
FIG. 7 is a flow chart showing a processing procedure according to an embodiment B3.

FIG. 7 is a flow chart showing a processing procedure according to the present embodiment.

When the receiving device 230 receives received signals, the digital signal acquisition circuit 2301 converts them to digital signals according to the signals received (step S31). The odd number offset discrete Fourier transform circuit 2302 compensates for frequency deviation according to frequency deviation information that indicates the frequency deviation of the converted digital signals, and applies an offset discrete Fourier transform to the odd point numbers (step S32).

The frequency deviation estimation circuit 2304 estimates the residual frequency deviation information using the digital signals of the frequency channels output from the odd number offset discrete Fourier transform circuit 2302, and outputs them to the offset Fourier transform circuit 2302. The odd number offset discrete Fourier transform circuit 2302 stores the estimated frequency deviation information in an internal storage section (step S33).

The frequency deviation estimation circuit 2304 outputs the digital signals to the decode circuit 2303.

The decode circuit 2303 decodes the signals of each of the frequency channels corresponding to the acquired signals (step S34).

The frequency deviation information stored in step S34 is derived by calculation processing performed repeatedly by the frequency deviation estimation circuit 2304, and updated.

In the receiving method according to the above processing procedure, even in the case where an ADC with a low sampling clock frequency is used, it is possible to decode desired received signals.

The relationship between frequency channel numbers for which an offset discrete Fourier transform is effective and point numbers of the offset discrete Fourier transform will be described with reference to the figures.

Figure 8A:
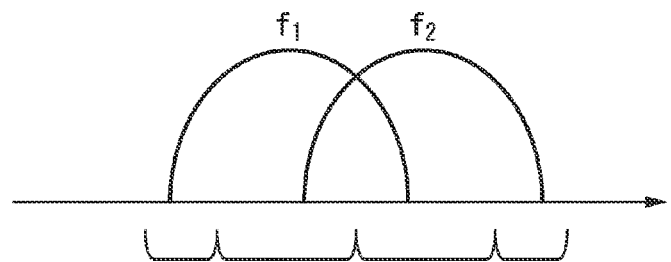
FIG. 8A is a diagram showing the arrangement of frequency channels, and point numbers of an offset discrete Fourier transform, of the present embodiment.
Figure 8B:
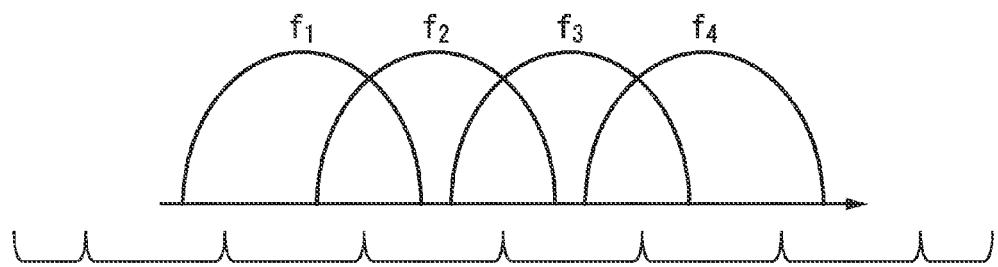
FIG. 8B is a diagram showing the arrangement of frequency channels, and point numbers of an offset discrete Fourier transform, of the present embodiment.
Figure 8C:
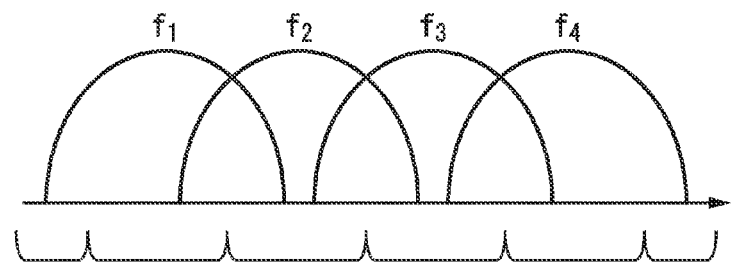
FIG. 8C is a diagram showing the arrangement of frequency channels, and point numbers of an offset discrete Fourier transform, of the present embodiment.

FIGS. 8A to 8C are diagrams showing the arrangement of frequency channels, and point numbers of an offset discrete Fourier transform. FIG. 8A shows an example of a case where the offset discrete Fourier transform circuit 2302 applies a three point offset discrete Fourier transform to two frequency channels as shown in FIG. 2.

In particular, in the case where a three point offset discrete Fourier transform is applied to two frequency channels as shown in FIG. 2, since signals can be decoded at 1.5 times oversampling, it is possible to set the clock of the ADC to be 25 percent lower than the case where two times oversampling is required, so that the offset discrete Fourier transform can be used especially effectively.

Moreover, in the case where an odd number offset discrete Fourier transform that can arrange the signal position at the center, the offset discrete Fourier transform can be particularly effective.

FIG. 8B shows a case in which four frequency channels are received, and a seven point offset discrete Fourier transform is performed. The sampling frequency of the ADC used to transform the received signals in this case becomes 1.75 times the bandwidth of one frequency channel, and the clock of the ADC can be set 12.5% lower.

FIG. 8C shows a case in which four frequency channels are received similarly, and a five point offset discrete Fourier transform is performed. The sampling frequency of the ADC used to transform the received signals in this case becomes 1.25 times the bandwidth of one frequency channel. In this case, the clock of the ADC can be set 37.5% lower. However, since the oversampling is low, there is a possibility that deterioration of the characteristics occurs.

Moreover, in the case where a seven point offset discrete Fourier transform is applied, it is possible to receive six frequency channels. Furthermore, it is also possible to perform seven point, nine point, and eleven point offset discrete Fourier transforms.

In the offset discrete Fourier transform of formula (B2), k can be from 0 to (n−1). However, it is also possible to reduce the calculation load by only calculating M in which a signal is input, and by not calculating $Z_k$, which has no corresponding signal domain. For example, it is possible to avoid calculating with respect to $Z_1$ by applying an offset discrete Fourier transform with n=3, and outputting only $Z_0$ and $Z_2$ to the decode circuit.

According to the embodiment of the present invention as described above, when applying a frequency transform to received signals that contain a small number of frequency channels using a Fourier transform, by shifting the transform location from the location of the Fourier transform, it is possible to separate the transmitted signals appropriately, so that it is possible to set the operation clock of the ADC low.

As described above, in such a case, the frequency is "0", that is, if it is set such that the DC component is at the boundary of a frequency channel without providing a frequency channel in the DC component, it is possible to reduce the deterioration of the signal quality due to noise and interference corresponding to the DC component.

The effects of the case in which an embodiment of the present invention is used will be described with reference to the figures.

Figure 9:
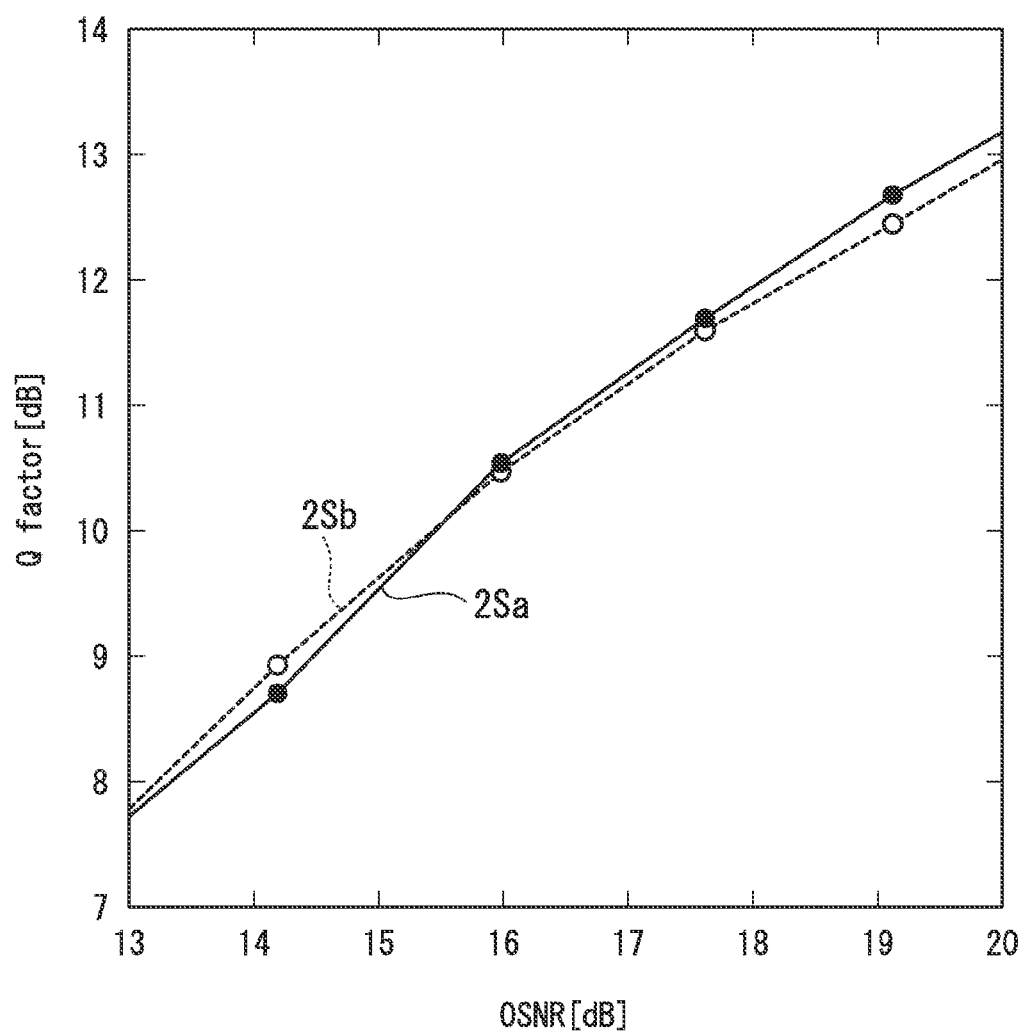
FIG. 9 is a diagram showing reception results of a signal that has been polarization multiplexed and transmitted, according to the present embodiment.

FIG. 9 is a diagram showing the reception results of a signal that has been polarization multiplexed and transmitted.

The vertical axis of this figure denotes the Q factor (dB (decibels)), and the horizontal axis denotes the optical signal to noise ratio (OSNR) (dB).

The reception results shown in the figure are measurements of received signals in communication using a 111 Gb/s (gigabits/second) QPSK (Quadrature Phase Shift Keying)-2 carrier OFDM (Orthogonal Frequency Division Multiplexing) signal which is polarization multiplexed and transmitted.

These measurements were performed in a back to back structure in which a transmitting device and a receiving device were connected using a simulated communication line. The transmitting device transmitted a 111 Gb/s signal as 13.5 Gbaud QPSK signals being two multiplexed in the frequency direction, furthermore being two polarization multiplexed.

In order to receive a two carrier×13.5 Gbaud signal in a receiving device, it is typically necessary to use a receiving device having an ADC at 55.5 GS/s (giga samples/second) to extract the corresponding frequency channels and decode it. By contrast, if a receiving device according to the present embodiment is used, it can be decoded using an ADC at 41.6 GS/s.

FIG. 7 shows the results of resampling and decoding a received signal at 50 GS/s to 55.5 GS/s (graph 2Sb), which are the results of a four point offset discrete Fourier transform. In contrast, results according to the present embodiment are shown (graph 2Sa) of calculating the Q-factor with respect to the OSNR in the case where a three point offset discrete Fourier transform is applied to a 46.1 GS/s received signal. As shown in the figure, it can be confirmed that in the present embodiment (graph 2Sa), although the sampling clock frequency of the ADC is greatly reduced, the results obtained are almost equivalent to the results (graph 2Sb) of a four point offset discrete Fourier transform using 55.5 GS/s data.

A digital signal acquisition step of the present embodiment acquires digital signals from the received signals that are multiplexed in the frequency domain. An offset discrete Fourier transform step applies an offset discrete Fourier transform to odd discrete point numbers based on the acquired digital signals. A decode step decodes frequency domain digital signals in the frequency domain obtained by the offset discrete Fourier transform, which are the frequency domain digital signals of one or more frequency channels.

As a result, it is possible for the odd number offset discrete Fourier transform circuit 2102 to select frequency channels corresponding to the transmitted signals appropriately even if the received signals are transformed into signals in the frequency domain using a Fourier transform in the case of receiving a few frequency channels. Furthermore, the digital signal acquisition circuit 2101 enables the sampling frequency of the ADC for acquiring the signal position using a Fourier transform to be reduced.

Moreover, as a result, it is possible to prevent the interference power and noise of the DC component from being detected as signals of the frequency channel by using an offset discrete Fourier transform with the boundary portion of the frequency channels as a frequency of "0", being a specific frequency.

The frequency deviation compensation step of the present embodiment compensates for frequency deviation with respect to frequencies of the obtained digital signals. The offset discrete Fourier transform step applies an offset discrete Fourier transform to odd discrete point numbers with respect to the digital signals that are frequency transformed to the frequencies in which frequency deviation is been compensated.

As a result, since the odd number offset discrete Fourier transform circuit 2102 can apply an offset discrete Fourier transform to the digital signals whose frequency deviation is compensated, it is possible to enhance the accuracy of the offset discrete Fourier transform.

A frequency deviation estimation step of the present embodiment estimates a residual frequency deviation of each of the frequency channels, or a frequency deviation common to all the frequency channels, from the digital signals transformed into the frequency domain by the offset discrete Fourier transform step, and updates frequency deviation information indicating the frequency deviation. The frequency deviation compensation step compensates for frequency deviation with respect to the frequencies of the obtained digital signals based on the frequency deviation information.

As a result, since the frequency deviation estimation circuit 2304 can estimate the frequency deviation on the basis of the calculation result, and apply an offset discrete Fourier transform to the digital signals compensated on the basis of the estimated frequency deviation information, it is possible to further enhance the accuracy of the offset discrete Fourier transform.

The offset discrete Fourier transform step of the present embodiment applies an offset discrete Fourier transform to the odd discrete point numbers using a convolution calculation with respect to digital signals, and calculates and outputs only frequency channels corresponding to the digital signals.

As a result, the odd number offset discrete Fourier transform circuit 2102 can separate the necessary information with no influence from the DC component and the like by performing a convolution calculation on the information of the frequency channels corresponding to the transmitted signals.

The offset discrete Fourier transform step of the present embodiment acquires, with the discrete point number of the offset discrete Fourier transform being three, two frequency channels out of them.

As a result, the odd number offset discrete Fourier transform circuit 2102 can accumulate unnecessary information such as a DC component in one frequency channel, so that it is possible to increase the quality of the information of the two frequency channels to be acquired. Furthermore, the ADC can convert to digital signals using a sampling clock with a frequency of twice the frequency band or less.

The offset discrete Fourier transform step compensates for an individual frequency deviation in each of the frequency channels.

As a result, it is possible to transform the necessary information using a frequency suitable to each of the frequency channels by compensating for the frequency deviation detected independently in each of the frequency channels.

Embodiment A1

Figure 10:
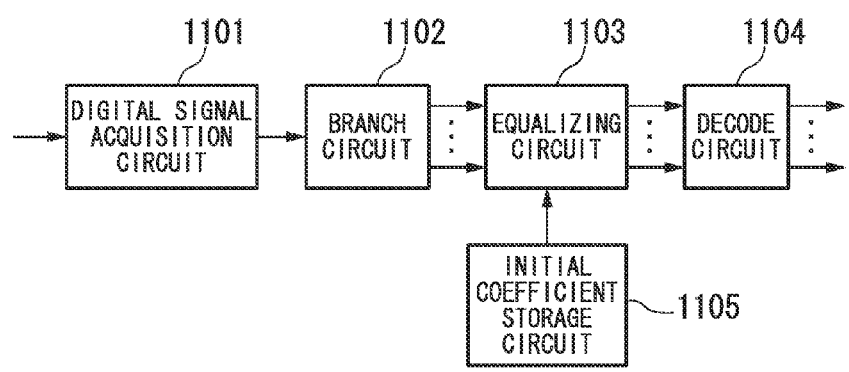
FIG. 10 is a block diagram showing the structure of a receiving device according to an embodiment A1 of the present invention.

FIG. 10 is a block diagram showing the structure of a receiving device according to an embodiment A1 of the present invention.

A receiving device 110 as shown in the figure includes a digital signal acquisition circuit 1101, a branch circuit 1102, an equalizing circuit 1103, a decode circuit 1104, and an initial coefficient storage circuit 1105.

The digital signal acquisition circuit 1101 converts received analog signals to digital signals.

The branch circuit 1102 duplicates and branches the digital signals converted by the digital signal acquisition circuit 1101 to channel numbers (L sequences) of the frequency channels for decoding, which are frequency channels contained in the received signals received by the digital signal acquisition circuit 1101.

The equalizing circuit 1103 equalizes each of the received L sequences signals branched by the branch circuit 1102. For the calculation processing in the equalizing circuit 1103, by utilizing prior knowledge about the desired signals, it is possible to use an equalization algorithm such as a minimum mean squared error (MMSE) method, a maximum SNR (MSN) method, a constrained output power minimization (CMP) method, or a constant modulus signal algorithm (CMA) (refer to Non-Patent Document 4).

Equalization of the signals of the $k^{th}$ frequency channel can be expressed by the following equation (A1) using an equalization weight $w_{k,i}$.

Formula (A1)

$$S_{k,i} = \sum_{n=0}^{M-1} w_{k,n+1} X_{i+n-M} \quad (A1)$$

In formula (A1), $S_{k,i}$ denotes a transmitted signal estimated with respect to the $i^{th}$ dispersion time of the $k^{th}$ frequency. M denotes the tap number of an equalization weight. $X_{i+n-M}$ denotes a received signal at reception timing (i+n−M). $w_{k,i}$ denotes the equalization coefficient of an equalization algorithm of the $k^{th}$ subcarrier. In the case where polarization multiplexing is performed in transmission, the two signals $S_{X,k,i}$ and $S_{Y,k,i}$ with respect to two orthogonally polarized waves can be obtained using the following formula (A2).

Formula (A2)

$$\begin{cases} S_{X,k,i} = \sum_{n=0}^{M-1} w_{XX,k,n+1} X_{X,i+n-M} + \sum_{n=0}^{M-1} w_{YX,k,n+1} X_{Y,i+n-M} \\ S_{Y,k,i} = \sum_{n=0}^{M-1} w_{XY,k,n+1} X_{X,i+n-M} + \sum_{n=0}^{M-1} w_{YY,k,n+1} X_{Y,i+n-M} \end{cases} \quad (A2)$$

In formula (A2), $X_{X,i+n-M}$ and $X_{Y,i+n-M}$ denote received signals corresponding to the X polarization and Y polarization at the reception timing (i+n−M). $w_{XX,k,i}$ denotes an equalization coefficient of an equalization algorithm used for a received X polarization signal in order to acquire a signal of the $k^{th}$ subcarrier transmitted with an X polarization. $w_{YX,k,i}$ denotes an equalization coefficient of an equalization algorithm used for a received Y polarization signal in order to obtain a signal of the $k^{th}$ subcarrier transmitted with an X polarization. Similarly, $w_{YY,k,i}$ and $w_{XY,k,i}$ denote an equalization coefficient of an equalization algorithm used for a received X polarization signal and an equalization coefficient of an equalization algorithm used for a received Y polarization signal in order to obtain signals of the $k^{th}$ subcarrier transmitted with a Y polarization.

The initial coefficient storage circuit 1105 stores coefficients with low correlation as initial weights so that equalization is performed with different weights with respect to each of the signal sequences as initial weights. By setting in this manner, the equalizing circuit can equalize signals corresponding to different frequency bands from each of the branched signal sequences.

For the initial weights, it is possible to select coefficients for extracting corresponding frequency channels in the discrete Fourier transforms. The discrete Fourier transforms can be obtained by the following formula. When a discrete Fourier transform is applied to n complex series $X_o, \ldots, X_{n-1}$, the signal $Y_k$ of the $k^{th}$ frequency channel is shown in formula (A3).

Formula (A3)

$$Y_k = \sum_{i=0}^{n-1} a_{k,i} X_i, \; a_{k,i} = \exp\left(-\frac{2\pi(k+d)i}{n}j\right) \quad (A3)$$

Figure 14A:
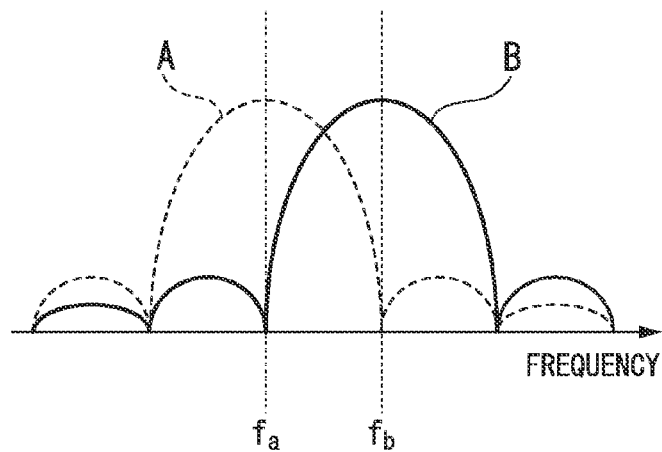
FIG. 14A is a diagram showing a state in which frequency deviation occurs in received signals.
Figure 14B:
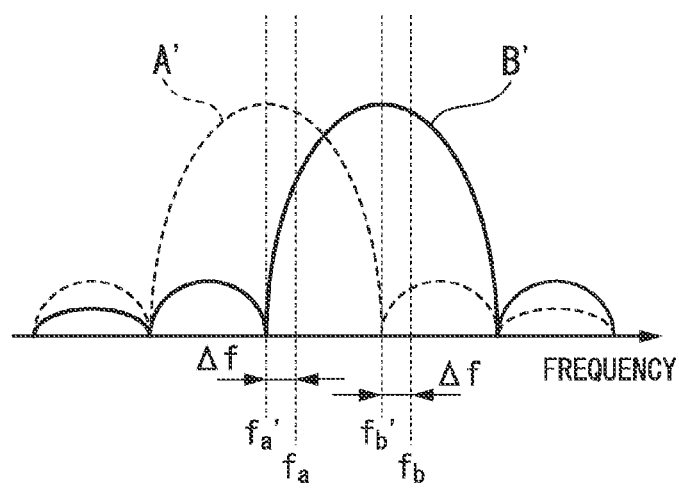
FIG. 14B is a diagram showing a state in which frequency deviation occurs in received signals.

Here, $0 \leq k \leq n-1$. 'd' corresponds to the shift width from the DC component of the frequency channel with k=0, and in the case where the DC component corresponds to the $0^{th}$ frequency channel, d=0. In the case where two frequency channels as shown in FIG. 14A and FIG. 14B are used, and where the DC component is in the center of the two frequency channels, 'd' is 0.5 or −0.5. $a_{k,i}$ is an equalization coefficient in a discrete Fourier transform, and this value can be made to be the initial value of the equalization algorithm. Moreover, in consideration of the characteristics of the device and information about the propagation path, an initial coefficient can also be made to be the initial coefficient by applying a calculation to the coefficient of the discrete Fourier transform. The initial values of equalization weight $w_k = [w_{k,1}, w_{k,2}, \ldots, w_{k,M}]^T$ with the tap number being M, which are used for the $k^{th}$ frequency channel, can be applied as $[0, 0, \ldots, 0, a_{k,0}, a_{k,1}, \ldots, a_{k,n-1}, 0, 0, \ldots 0]^T$. The superscript T is an operator that takes the transpose. Here, the sum of the numbers "0" in the first half and "0" in the latter half is $N_z$, and it satisfies the relationship $N_z + n = M$. Alternatively, in order to reduce the constraint condition, it is also possible to substitute a desired number from $a_{k,0}, a_{k,1}, \ldots, a_{k,n-1}$ for "0". In this manner, using the coefficients stored in the initial coefficient storage circuit 1105, the equalizing circuit 1103 can equalize the signals of each of the frequency channels. In the equalizing circuit 1103, it is also possible to apply a constraint condition such that the correlation between $w_k$ and $w_j$ becomes low under the condition that the converged weight $k \neq j$. By determining the equalization weight in this manner, signal separation by equalization is possible while correcting for frequency deviation.

For the initial weights in the case where different signals are transmitted with X polarizations and Y polarizations in the transmission using polarization multiplexing, by setting the initial values of $w_{XX,k} = [w_{XX,k,1}, w_{XX,k,2}, \ldots, w_{XX,k,M}]^T$ and $w_{YX,k} = [w_{YX,k,1}, w_{YX,k,2}, \ldots, w_{YX,k,M}]^T$ to $[0, 0, \ldots, 0, a_{k,0}, a_{k,1}, \ldots, a_{k,n-1}, 0, 0, \ldots 0]^T$ and $[0, 0, \ldots, 0]^T$, and by setting $w_{XY,k} = [w_{XY,k,1}, w_{XY,k,2}, \ldots, w_{XY,k,M}]^T$ and $w_{YY,k} = [w_{YY,k,1}, w_{YY,k,2}, \ldots, w_{YY,k,M}]^T$ such that they are $[0, 0, \ldots, 0]^T$ and $[0, 0, \ldots, 0, a_{k,0}, a_{k,1}, \ldots, a_{k,n-1}, 0, 0, \ldots 0]^T$, it is possible to make them orthogonal with equalization weights corresponding to the same frequency channels. Alternatively, a relationship that satisfies orthogonal conditions can be applied between the polarizations. For example, in the case where a 2×2 orthogonal Walsh code is used, by setting the initial values of $w_{XX,k}$ and $w_{YX,k}$ to $[0, 0, \ldots, 0, a_{k,0}, a_{k,1}, \ldots, a_{k,n-1}, 0, 0, \ldots 0]^T$ and $[0, 0, \ldots, 0, a_{k,0}, a_{k,1}, \ldots, a_{k,n-1}, 0, 0, \ldots 0]^T$, and by setting $w_{XY,k}$ and $w_{YY,k}^T$ to $[0, 0, \ldots, 0, a_{k,0}, a_{k,1}, \ldots, a_{k,n-1}, 0, 0, \ldots 0]^T$ and $[0, 0, \ldots, 0, -a_{k,0}, -a_{k,1}, \ldots, -a_{k,n-1}, 0, 0, \ldots 0]^T$, it is possible to make them orthogonal with equalization weights corresponding to the same frequency channels.

That is, when $w_{XX,k}=[0, 0, \ldots, 0, b_{xx}a_k, 0, b_{xx}a_{k,1}, \ldots, b_{xx}a_{k,n-1}, 0, 0, \ldots, 0]^T$, $w_{YX,k}=[0, 0, \ldots, 0, b_{yx}a_{k,0}, b_{yx}a_{k,1}, \ldots, b_{yx}a_{k,n-1}, 0, 0, \ldots 0]^T$, $w_{XY,k}=[0, 0, \ldots, 0, b_{xy}a_{k,0}, b_{xy}a_{k,1}, \ldots, b_{xy}a_{k,n-1}, 0, 0, \ldots 0]^T$, $w_{YY,k}=[0, 0, \ldots, 0, b_{yy}a_{k,0}, b_{yy}a_{k,1}, \ldots, b_{yy}a_{k,n-1}, 0, 0, \ldots 0]^T$, it is possible to set $b_{xx}$, $b_{yx}$, $b_{xy}$, $b_{yy}$ such that $b_{xx}b_{xy}+b_{yx}b_{yy}$ becomes 0 or a small value approaching 0. Furthermore, $b_{xx}$, $b_{yx}$, $b_{xy}$, $b_{yy}$ can also be set in each of the frequency channels independently.

The decode circuit 1104 decodes the signals equalized by the equalizing circuit 1103 according to the encoding system and modulation system. However, the compensation quality of the originally possessed by the equalizer with respect to the time duration of a signal deteriorates with the number of frequency channels n. That is, the receiving device 10 consumes an equivalent quality relative to the time duration of the received signal over the number of frequency channels, n, in the Fourier transform. As a result, the receiving device 110 does not need frequency deviation estimation and compensation in the Fourier transform.

Alternatively, in the branch circuit 1102, the frequency can be shifted with respect to each of the frequency channels, and output. In this case, the $k^{th}$ received signal branched for decoding the $k^{th}$ frequency channel is output from the branch circuit 102 after the following calculation.

Formula (A4)

$$X'_k = X_k \exp\left(\frac{-2\pi k F_k}{F_s}j\right) \quad (A4)$$

In formula (A4), $X'_k$ is a signal output from the branch circuit. $F_s$ is the sampling frequency. $F_k$ is the central frequency of the $k^{th}$ frequency channel in the receiving device. The central frequency of the $k^{th}$ frequency channel used here does not need to be accurate, and it is possible to use an approximate value that is stored in advance or a roughly estimated central position of each of the frequency channels. In this manner, with respect to a signal whose frequency is shifted, the equalizing circuit can set an equalization weight to the central frequency channel, and can use $[0, 0, \ldots, 0, 1, 1, \ldots 1, 0, 0, \ldots, 0]$ as initial values of the equalization weights. Here, the number of "1's" is n, and the number of "0's" is Nz. Furthermore, in order to reduce the constraint condition, it is also possible to transform an arbitrary number among the "1's" to "0". In this case, since the equalization coefficient for each of the frequency channels does not always become low, it is possible to apply a constraint condition such that the correlation becomes low with coefficients $d=0$, $k \neq 0$ in $a_{k,i}$ of formula (A3), or apply a constraint condition such that the correlation of the equalized signals becomes low.

Embodiment A2

An embodiment A2 of the present invention will be described with reference to the figures.

Figure 11:
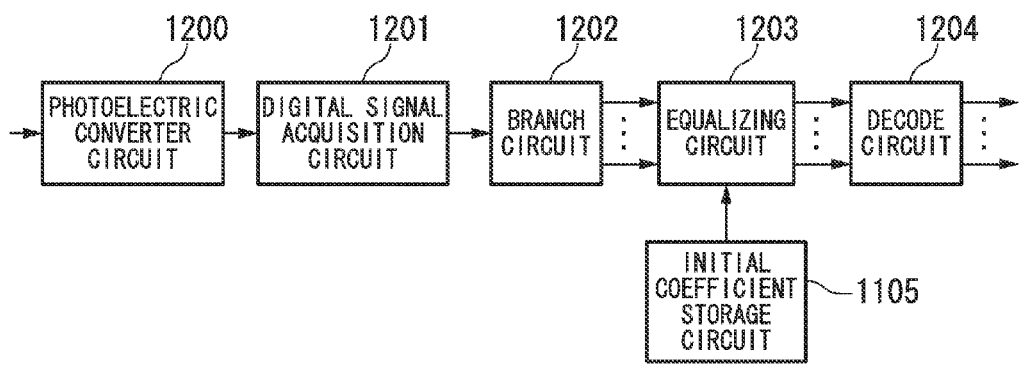
FIG. 11 is a block diagram showing the structure of a receiving device according to an embodiment A2.

FIG. 11 is a block diagram showing the structure of a receiving device according to the embodiment A2 of the present invention.

A receiving device 120 as shown in this figure includes a photoelectric converter circuit 1200, a digital signal acquisition circuit 1201, a branch circuit 1202, an equalizing circuit 1203, a decode circuit 1204, and an initial coefficient storage circuit 1205. The receiving device 120 receives optical signals.

Firstly, the photoelectric converter circuit 1200 transforms received optical signals into electrical signals.

The digital signal acquisition circuit 1201 converts the electrical signals transformed by the photoelectric converter circuit 1200 into digital signals.

The branch circuit 1202 duplicates and branches the digital signals converted by the digital signal acquisition circuit 1201 to channel numbers (L sequences) of the frequency channels for decoding, which are frequency channels contained in the received signals converted by the digital signal acquisition circuit 1201.

The initial coefficient storage circuit 1205 stores discrete Fourier transform coefficients expressed by formula (A3), or coefficients having high correlation with discrete Fourier transform coefficients, or coefficients that can be expressed using part of them.

The equalizing circuit 1203 equalizes the L sequences of signals branched by the branch circuit 1202 using the initial weights stored in the initial coefficient storage circuit 1205. For the calculation processing in the equalizing circuit 1203, by utilizing prior knowledge about the desired signals, it is possible to use an equalization algorithm such as a minimum mean squared error (MMSE) method, a maximum SNR (MSN) method, a constrained output power minimization (CMP) method, or a constant modulus signal algorithm (CMA). In the calculation processing in the equalizing circuit 1203, it is possible to extract signals with different frequency channels by using known signals, applying constraint conditions such that the equalization coefficient has low correlation between different frequency channels, and applying constraint conditions such that the correlation of output signals becomes low.

The decode circuit 1204 decodes the signals of specific frequency channels extracted by the equalizing circuit 1203. In optical communication in which synchronous detection is performed, since the wavelength deviation between lasers in a transmitting device and a receiving device is especially great, by not needing a frequency deviation compensation function in a Fourier transform, it is possible to reduce the size of the circuit.

The branch circuit 1202 can shift the frequencies of signals after branching, and output them similarly to formula (A4).

Since the maximum value of frequency deviation in optical communication can be considered to be greater than the bandwidth of the frequency channels, the branch circuit 1202 roughly estimates the frequency deviation from known signals contained in the received signals or the spectrum distribution, and shifts the frequency using formula (A4) in respect of all the sequences, so that it is possible to improve the transmission quality of the signals after branching.

Effects of the present embodiment will be described with reference to the figures.

Figure 12:
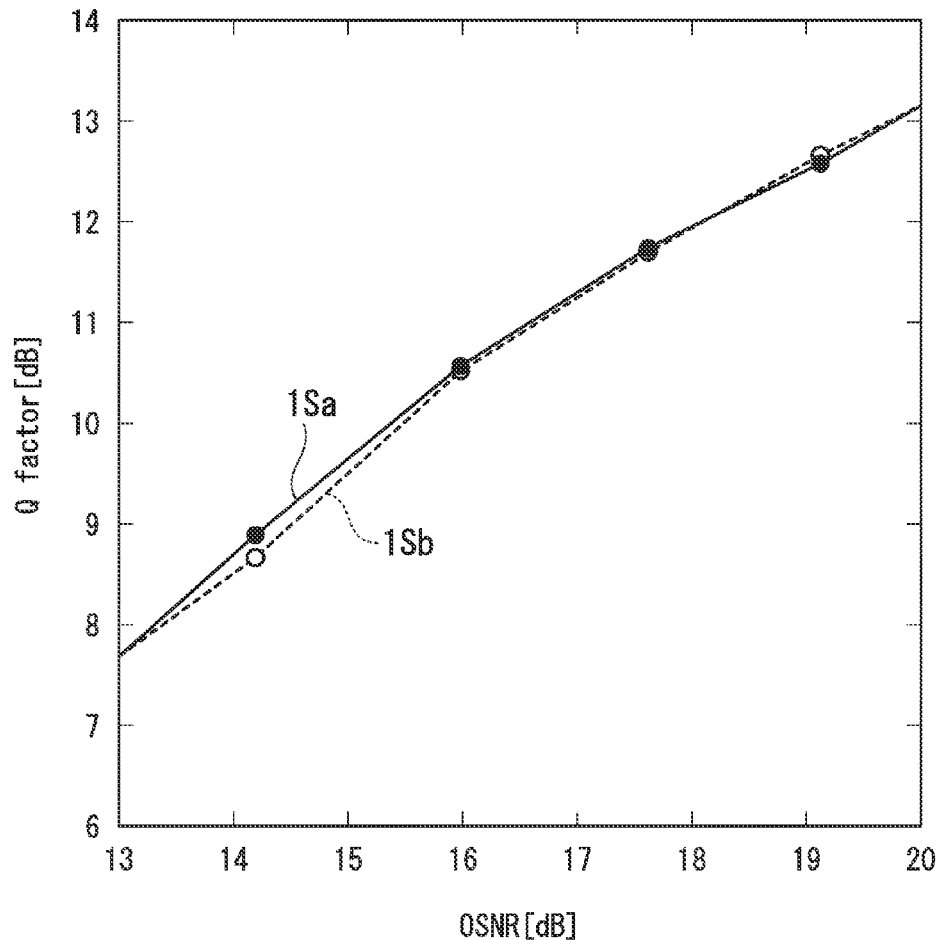
FIG. 12 is a diagram showing reception results of a signal that has been polarization multiplexed and transmitted, according to the embodiment A2.
Figure 13:
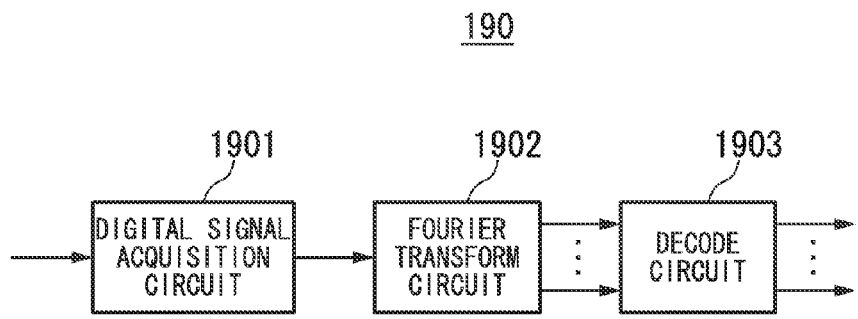
FIG. 13 is a block diagram showing the structure of a receiving device of a conventional system.

FIG. 12 is a diagram showing reception results of a signal that has been polarization multiplexed and transmitted.

The vertical axis of this figure denotes the Q factor (dB), and the horizontal axis denotes the optical signal to noise ratio (OSNR) (dB).

The reception results shown in this figure are measurements of received signals in communication using a 111 Gb/s (gigabits/second) QPSK (Quadrature Phase Shift Keying)–2 carrier OFDM (Orthogonal Frequency Division Multiplexing) signal which is polarization multiplexed and transmitted.

These measurements were performed in a back to back structure in which a transmitting device and a receiving device were connected using an optical fiber. The transmitting device transmitted a 111 Gb/s signal as 13.5 Gbaud (giga baud) QPSK signals being two multiplexed in the frequency direction, being two polarization multiplexed. In the receiving device, a signal received at 50 GS/s (giga samples/second) is transformed to 55.5 GS/s by offline processing and decoded according to the present invention. Results from the present embodiment are shown in graph line 1Sa. Furthermore, graph 1Sb shows, for comparison, the results from a conventional system in which decoding was performed after a Fourier transform was applied. In the conventional system in which a Fourier transform was applied, in order to apply the Fourier transform correctly, frequency deviation estimation was performed using a constant modulus algorithm (CMA) before the Fourier transform. FIG. 12 shows that the same characteristics were obtained in the case where a Fourier transform was applied (graph 1Sb) and the case where equalization was performed without it (graph 1Sa). As shown in FIG. 12, it can be confirmed that in the present embodiment, although a Fourier transform and frequency deviation estimation have not been performed prior, the same characteristics are obtained as in the results of decoding after a discrete Fourier transform has been applied.

In the method shown in the present embodiment, the greater the frequency deviation, the greater the effect. Moreover, in the receiving device shown in the present embodiment, by providing a channel that is used for a Fourier transform, there is a case in which a drop occurs in the tolerance against polarization mode dispersion. However, by increasing the number of equalization taps, it is possible to avoid the drop in the tolerance easily.

In the receiving device 110 of the present embodiment, when decoding received signals that are multiplexed in the frequency domain, the digital signal acquisition circuit 1101 acquires digital signals from the received signals that are multiplexed in the frequency domain. The branch circuit 1102 branches the obtained digital signals to frequency channel numbers for decoding. The initial coefficient storage circuit 1105 stores coefficients with low and different correlation with respect to each of the signal sequences as initial weights. The equalizing circuit 1103 equalizes the branched signal sequences using the different coefficients. The decode circuit 1104 decodes each of the equalized signal sequences.

As a result, it is possible to decode the signals transmitted by the orthogonal frequency division multiplexing system without applying a discrete Fourier transform. In the decode circuit 1104, frequency deviation estimation and compensation of the discrete Fourier transform can be made unnecessary.

In the receiving device 110 of the present embodiment, the digital signal acquisition circuit 1101 acquires digital signals from received signals that are multiplexed in the frequency domain. The branch circuit 1102 branches the obtained digital signals to frequency channel numbers for decoding. The initial coefficient storage circuit 1105 stores coefficients having high correlation with the coefficients of the discrete Fourier transform corresponding to each of the frequency channels, or coefficients including at least part of them, as initial weights with respect to each of the branched signal sequences. The equalizing circuit 1103 equalizes the coefficients stored in the initial coefficient storage step as initial weights. The decode circuit 1104 decodes each of the equalized signal sequences.

As a result, by the equalizing circuit 1103 blindly equalizing the coefficients of a discrete Fourier transform for acquiring the central frequency of each of the frequency channels as initial values, it is possible to decode the signals transmitted by the orthogonal frequency division multiplexing system without applying discrete Fourier transforms to the frequency channels for equalizing.

In the receiving device 110 of the present embodiment, when branching digital signals in the branch circuit 1102, branching is performed after the frequency transform is applied such that the central frequency of each of the frequency channels becomes a DC component, and the initial coefficient storage circuit 1105 stores coefficients having high correlation with the coefficients of the discrete Fourier transform corresponding to the specific frequency component, or coefficients including at least part of them, as initial weights.

As a result, since the frequencies of the branched signals are transformed, and the frequency deviation can be corrected, the reception quality of equalization processing and decoding processing can be ensured. Therefore, it is possible to decode the signals transmitted by the orthogonal frequency division multiplexing system without applying a discrete Fourier transform.

In the receiving device 110 of the present embodiment, the equalization coefficients are adjusted such that none of the signal sequences equalized in the equalizing circuit 1103 converges to a signal sequences indicating the same signal.

As a result, the equalized signals are prevented from being the same signal, so that it is possible to decode the signals transmitted by the orthogonal frequency division multiplexing system without applying a discrete Fourier transform.

Similar effects can be obtained in the receiving device 120.

INDUSTRIAL APPLICABILITY

The present invention can be used for a method for receiving frequency domain multiplexed signals and a device for receiving frequency domain multiplexed signals. According to the method for receiving frequency domain multiplexed signals and the device for receiving frequency domain multiplexed signals, sampling is possible with a lower frequency than that of twice the frequency band of the received signals.

REFERENCE SYMBOLS

110 Receiving device
1101 Digital signal acquisition circuit
1102 Branch circuit
1103 Equalizing circuit
1104 Decode circuit
1105 Initial coefficient storage circuit
210 Receiving device
2101 Digital signal acquisition circuit
2102 Odd number offset discrete Fourier transform circuit
2103 Decode circuit

The invention claimed is:

1. A frequency domain multiplexed signal receiving method which decodes received signals that are multiplexed in a frequency domain, the method comprising:
acquiring digital signals from the received signals that are multiplexed in the frequency domain;
applying an offset discrete Fourier transform of n discrete point numbers (n represents an odd number) on the acquired digital signals to obtain n frequency domain digital signals in the frequency domain, the n frequency domain digital signals corresponding to k=0 to n−1, respectively, and outputting the frequency domain digital signals except the frequency domain signal corresponding k=(n−1)/2; and
decoding at least one of the output frequency domain digital signals,
wherein the offset discrete Fourier transformation is applied using a formula:

$$Z_k = \sum_{i=0}^{n-1} X_i \exp\left(-\frac{\pi i(2k+1)}{n}j\right)$$

wherein, in the formula, $Z_k$ represents a frequency domain digital signal, $X_i$ represents an acquired digital signal, and j represents an imaginary unit.

2. The frequency domain multiplexed signal receiving method according to claim 1, further comprising compensating for frequency deviation with respect to frequencies of the obtained digital signals, wherein in applying the offset discrete Fourier transform the offset discrete Fourier transform of the n discrete point numbers is applied with respect to the digital signals that are frequency transformed into the frequencies in which the frequency deviation is compensated.

3. The frequency domain multiplexed signal receiving method according to claim 1, further comprising estimating a residual frequency deviation of each of the frequency channels, or a frequency deviation common to all of the frequency channels, from the digital signals transformed into the frequency domain by the offset discrete Fourier transform, and updating frequency deviation information indicating the frequency deviation, and compensating for frequency deviation with respect to the frequencies of the obtained digital signals based on the frequency deviation information.

4. The frequency domain multiplexed signal receiving method according to claim 1, wherein in applying the offset discrete Fourier transform the offset discrete Fourier transform of the n discrete point numbers is applied with respect to the digital signals using a convolution calculation, and calculates and outputs only frequency channels corresponding to the digital signals.

5. The frequency domain multiplexed signal receiving method according to claim 1, wherein the offset discrete Fourier transform acquires, with the discrete point number of the offset discrete Fourier transform being three, two frequency channels out of them.

6. The frequency domain multiplexed signal receiving method according to claim 1, wherein the offset discrete Fourier transform compensates for an individual frequency deviation in each of the frequency channels.

7. A frequency domain multiplexed signal receiving device which decodes received signals that are multiplexed in a frequency domain, the device comprising:

a digital signal acquisition circuit which acquires digital signals from the received signals that are multiplexed in the frequency domain;

an offset discrete Fourier transform processing circuit which applies an offset discrete Fourier transform of n discrete point numbers (n represents an odd number) on the acquired digital signals to obtain n frequency domain digital signals in the frequency domain, the n frequency domain digital signals corresponding to k=0 to n−1, respectively, the offset discrete Fourier transform processing circuit outputting the frequency domain digital signals except the frequency domain signal corresponding k=(n−1)/2; and a decoder circuit which decodes at least one of the output frequency domain digital signals, wherein the offset discrete Fourier transform processing circuit applies the offset discrete Fourier transformation using a formula:

$$Z_k = \sum_{i=0}^{n-1} X_i \exp\left(-\frac{\pi i(2k+1)}{n}j\right)$$

wherein, in the formula, $Z_k$ represents a frequency domain digital signal, $X_i$ represents an acquired digital signal, and j represents an imaginary unit.

8. The frequency domain multiplexed signal receiving device according to claim 7, further comprising a frequency deviation compensation circuit which compensates for frequency deviation with respect to frequencies of the obtained digital signals, wherein the offset discrete Fourier transform processing circuit applies the offset discrete Fourier transform of the n discrete point numbers with respect to the digital signals that are frequency transformed into the frequencies in which the frequency deviation is compensated.

9. The frequency domain multiplexed signal receiving device according to claim 7, further comprising a frequency deviation estimation circuit which estimates a residual frequency deviation in the offset discrete Fourier transform processing circuit from the obtained digital signals, and updates frequency deviation information indicating the frequency deviation, wherein the frequency deviation compensation circuit compensates for the frequency deviation with respect to the frequencies of the obtained digital signals based on the frequency deviation information.

10. A frequency domain orthogonally multiplexed signal receiving method for decoding a received signal that is orthogonally multiplexed in a frequency domain, the method comprising:

acquiring a digital signal from the received signal that is orthogonally multiplexed in the frequency domain;

duplicating the obtained digital signal by the number of times equals to the number of frequency channels for decoding;

branching the duplicated digital signals to obtain a digital signal for each frequency channel, the digital signal for each frequency channel being the same as each other;

storing, with respect to a digital signal corresponding to a $k^{th}$ frequency channel among the digital signal for each frequency channel, coefficients of $[0, \ldots, 0, a_{k,0}, a_{k,1}, \ldots, a_{k,n-1}, 0, \ldots 0]$ as initial weights of the digital signal corresponding to the $k^{th}$ frequency channel, using coefficients $a_{k,0}, a_{k,1}, \ldots, a_{k,n-1}$ of an n point discrete Fourier transform;

equalizing the digital signal for each frequency channel using the stored coefficients as the initial weights; and decoding the equalized digital signal for each frequency channel.

11. A frequency domain orthogonally multiplexed signal receiving method for decoding a received signal that is orthogonally multiplexed in a frequency domain, the method comprising:

acquiring a digital signal from the received signal that is orthogonally multiplexed in the frequency domain;

duplicating the obtained digital signal by the number of times equals to the number of frequency channels for decoding;

branching the duplicated digital signals to obtain a digital signal for each frequency channel, the digital signal for each frequency channel being the same as each other;

storing, with respect to a digital signal corresponding to a $k^{th}$ frequency channel among the digital signal for each frequency channel, using coefficients $a_{k,0}, a_{k,1}, \ldots, a_{k,n-1}$ of an n point discrete Fourier transform, coefficients including at least part of the coefficients of the discrete Fourier transform, or coefficients including at least part of coefficients having high correlation with the coefficients of the discrete Fourier transform, as initial weights;

equalizing the digital signal for each frequency channel using the stored coefficients as the initial weights; and decoding the equalized digital signal for each frequency channel.

12. A frequency domain orthogonally multiplexed signal receiving method for decoding a received signal that is orthogonally multiplexed in a frequency domain, the method comprising:

acquiring a digital signal from the received signal that is orthogonally multiplexed in the frequency domain;

duplicating the obtained digital signal by the number of times equals to the number of frequency channels for decoding;

branching the duplicated digital signals to obtain a digital signal for each frequency channel, the digital signal for each frequency channel being the same as each other;

storing, with respect to a digital signal corresponding to a $k^{th}$ frequency channel among the digital signal for each frequency channel, using coefficients $a_{k,0}, a_{k,1}, \ldots, a_{k,n-1}$ of an n point discrete Fourier transform, coefficients including at least part of the coefficients of the discrete Fourier transform, or coefficients including at least part of coefficients having high correlation with the coefficients of the discrete Fourier transform, as initial weights;

equalizing the digital signal for each frequency channel using the stored coefficients as the initial weights; and decoding the equalized digital signal for each frequency channel, wherein when branching the digital signals, after applying a frequency transform, branching such that a central frequency of each of the frequency channels approaches the vicinity of a specific frequency component, and storing coefficients having high correlation with coefficients of the discrete Fourier transform corresponding to a specific frequency component in discrete Fourier transform, or coefficients including at least part of them, as initial weights, in the discrete Fourier transform.

13. A frequency domain orthogonally multiplexed signal receiving method for decoding a received signal that is orthogonally multiplexed in a frequency domain, the method comprising:

acquiring a digital signal from the received signal that is orthogonally multiplexed in the frequency domain;

duplicating the obtained digital signal by the number of times equals to the number of frequency channels for decoding;

branching the duplicated digital signals to obtain a digital signal for each frequency channel, the digital signal for each frequency channel being the same as each other;

storing different coefficients with low correlation as initial weights with respect to the digital signal for each frequency channel;

equalizing the digital signal for each frequency channel using the different coefficients; and decoding the equalized digital signal for each frequency channel, wherein equalization coefficients are adjusted such that the equalized digital signal for each frequency channel does not converge to a digital signal indicating the same signal.

14. A frequency domain orthogonally multiplexed signal receiving method for decoding received signals that are orthogonally multiplexed in a frequency domain, the method comprising:

acquiring two received signals that are orthogonally multiplexed in the frequency domain with respect to different polarization components, and acquiring digital signals from each of them;

duplicating the two acquired digital signals by the number of times equals to the number of frequency channels for decoding;

branching the duplicated plurality sets of two digital signals to obtain two digital signals for each frequency channel, the two digital signals for each frequency channel being the same as each other;

storing, with respect to two digital signals corresponding to a $k^{th}$ frequency channel among the two digital signals for each frequency channel, $[0, \ldots, 0, b_{xx}a_{k,0}, b_{xx}a_{k,1}, \ldots, b_{xx}a_{k,n-1}, 0, \ldots 0]$ and $[0, \ldots, 0, b_{yx}a_{k,0}, b_{yx}a_{k,1}, \ldots, b_{yx}a_{k,n-1}, 0, \ldots 0]$ in order to decode a signal corresponding to one polarization, and $[0, \ldots, 0, b_{xy}a_{k,0}, b_{xy}a_{k,1}, \ldots, b_{xy}a_{k,n-1}, 0, \ldots 0]$ and $[0, \ldots, 0, b_{yy}a_{k,0}, b_{yy}a_{k,1}, \ldots, b_{yy}a_{k,n-1}, 0, \ldots 0]$ in order to decode a signal corresponding to a different polarization, as initial weights of digital signals of the two polarization components, using coefficients $a_{k,0}, a_{k,1}, \ldots, a_{k,n-1}$ of an n point discrete Fourier transform, such that each satisfies $b_{xx}b_{xy}+b_{yx}b_{yy}=0$;

equalizing the two digital signals for each frequency channel with respect to the two polarization components using the stored coefficients as the initial weights; and decoding the equalized two digital signals for each frequency channel.

15. A frequency domain orthogonally multiplexed signal receiving device for decoding a received signal that is orthogonally multiplexed in a frequency domain, the device comprising:

a digital signal acquisition circuit which acquires a digital signal from the received signal that is orthogonally multiplexed in the frequency domain;

a branching circuit which duplicates the obtained digital signal by the number of times equals to the number of frequency channels for decoding, and branches the duplicated digital signals to obtain a digital signal for each frequency channel, the digital signal for each frequency channel being the same as each other;

an initial coefficient storage memory circuit which stores, with respect to a digital signal corresponding to a $k^{th}$ frequency channel among the digital signal for each frequency channel, using coefficients $a_{k,0}, a_{k,1}, \ldots, a_{k,n-1}$ of an n point discrete Fourier transform, coefficients of $[0, \ldots, 0, a_{k,0}, a_{k,1}, \ldots, a_{k,n-1}, 0, \ldots 0]$, coefficients including at least part of the coefficients of the discrete Fourier transform, or coefficients including at least part of coefficients having high correlation with the coefficients of the discrete Fourier transform, as initial weights;

an equalization circuit which equalizes the digital signal for each frequency channel using the coefficients stored in the initial coefficient storage memory circuit; and a decoding circuit which decodes the equalized digital signal for each frequency channel.

16. A frequency domain orthogonally multiplexed signal receiving device for decoding an optical signal that is orthogonally multiplexed in a frequency domain, the device comprising:
- a photoelectric converter circuit which converts the optical signal that is orthogonally multiplexed in the frequency domain into an electrical signal;
- a digital signal acquisition circuit which acquires a digital signal from the electrical signal;
- a branching circuit which duplicates the obtained digital signal by the number of times equals to the number of frequency channels for decoding, and branches the duplicated digital signals to obtain a digital signal for each frequency channel, the digital signal for each frequency channel being the same as each other;
- an initial coefficient storage memory circuit which stores, with respect to a digital signal corresponding to a $k^{th}$ frequency channel among the digital signal for each frequency channel, using coefficients $a_{k,0}, a_{k,1}, \ldots, a_{k,n-1}$ of an n point discrete Fourier transform, coefficients of $[0, \ldots, 0, a_{k,0}, a_{k,1}, \ldots, a_{k,n-1}, 0, \ldots 0]$, coefficients including at least part of the coefficients of the discrete Fourier transform, or coefficients including at least part of coefficients having high correlation with the coefficients of the discrete Fourier transform, as initial weights;
- an equalization circuit which equalizes the digital signal for each frequency channel using the coefficients stored in the initial coefficient storage memory circuit; and
- a decoder circuit which decodes the equalized digital signal for each frequency channel.

* * * * *